US005790669A

United States Patent [19]
Miller et al.

[11] Patent Number: 5,790,669
[45] Date of Patent: Aug. 4, 1998

[54] LIGHTWEIGHT NON-REPUDIATION SYSTEM AND METHOD

[75] Inventors: Mark S. Miller, Los Altos; Christopher T. Hibbert, Mountain View; Norman Hardy, Portola Valley; E. Dean Tribble, Los Altos Hills, all of Calif.

[73] Assignee: Sun Microsystems, Inc., Mountain View, Calif.

[21] Appl. No.: 675,258

[22] Filed: Jul. 1, 1996

[51] Int. Cl.$^6$ .................................................. H04L 9/32
[52] U.S. Cl. .............................. 380/25; 380/30; 380/48
[58] Field of Search .............................. 380/23, 25, 30, 380/48, 49

[56] References Cited

U.S. PATENT DOCUMENTS

| | | | |
|---|---|---|---|
| 4,458,109 | 7/1984 | Mueller-Schloer | 380/25 |
| 5,018,196 | 5/1991 | Takaragi et al. | 380/30 |
| 5,226,079 | 7/1993 | Holloway | 380/25 |
| 5,568,554 | 10/1996 | Eastlake, 3rd | 380/25 |

OTHER PUBLICATIONS

Codie Wells: A Note On "Protection Imperfect" (1988) 2 pages.

Marc Shapiro, et al.: Some Key Issues In The Design Of Distributed Garbage Collection And References (Apr. 15, 1994) pp. 1–13.

M. Anderson, et al.: A Password–Capability System (1986) The Computer Journal, vol. 29, No. 1.

Andrew Birrell, et al.: Network Objects (SRC Research Reports #115) (Feb. 28, 1994) pp. 1–65.

Andrew Birrell, et al.: Distributed Garbage Collection For Network Objects (SRC Research Report #116) pp. 1–18.

Norm Hardy, The Confused Deputy (1985) 2 pages.

A.S. Tanenbaum, et al.: Using Sparse Capability In A Distributed Operating System (1986) Proc. Sixth Int'l Conf. On Distributed Computing Systems. IEEE, pp. 558–563.

Robert D. Sansom, et al.: Extending A Capability Based System Into A Network Environment (1986) Research sponsored by DOD, pp. 265–274.

List of Amoeba Papers, 3 pages.

Robert van Renesse, et al.: Wide–Area Communication Under Amoeba (Dec. 1986) IR–117, Vrije Universiteit, pp. 114–126.

Robert van Renesse, et al.: Connecting RPC–Based Distributed Systems Using Wide–Area Networks (1987) Proc. Seventh Int'l Conf. on Distr. Comp. Systems, IEEE, pp. 28–34.

Robert van Renesse, et al.: The Performance Of The Amoeba Disributed Operating System (Mar. 1989) Software—Practice and Experience, vol. 19, pp. 223–234.

(List continued on next page.)

*Primary Examiner*—Gilberto Barrón, Jr.
*Attorney, Agent, or Firm*—Douglas J. Crisman; Flehr Hohbach Test Albritton & Herbert LLP

[57] ABSTRACT

A system and method is disclosed that provides lightweight non-repudiability for networked computer systems. Each party to a two-party communication maintains hashes on its incoming and outgoing messages. At its discretion, either party can request that the other party commit to the conversation. The second party (if it agrees) then sends signed hashes that third parties can use to verify the content of the conversation. The party requesting the commitment stores its corresponding hashes when it sends the request. If the hashes from both parties are the same for the same positions in their conversation, the two parties can verify that their conversation is error-free. If the sending party also maintains logs of both sides (incoming and outgoing) of the conversation and stores hashes corresponding to the beginning of the logs, the sending party is also able to verify to a third party that the logged portion of the conversation was between the first party and the second party. Non-repudiability for entire conversations consisting of millions of messages can therefore be provided using a single pair of commit message and commitment/signature messages.

19 Claims, 5 Drawing Sheets

```
1) B.synchronize()                    2) A.synchronize()
3a) accumulate hasAB(out)             3b) accumulate hashBA(in)
4b) accumulate hashAB(in)             4a) accumulate hashBA(out)
5a) open logs
   5b) logHashAB(out)=
       hashAB(out)
   5c) logHashAB(in)=
       hashAB(in)
6a) B.commit()
   6b) CHashAB(out)=                  7) CHashBA(in)=
       hashAB(out)                       hashBA(in)
   6c) close log(out)
                                      8a) A.commitment()
9a) CHashAB(in)=                         8b) CHashBA(out)=
    hashAB(in)                              hashBA(out)
9b) close logAB(in)                   10) A.signatureB(CHashBA(in),
                                          CHashBA(out))
```

OTHER PUBLICATIONS

M. Frans Kaashoek, et al.: Transparent Fault–Tolerance In Parallel ORCA Programs (Mar. 1992) Symposium on Experiences with Distributed and Multiprocessor Systems III. Newport Beach. pp. 297–312.

Robert van Renesse, et al.: Voting With Ghosts (1988) Proc. Eighth Int'l. Conf. on Distr. Computer Systems, IEEE, pp. 456–461.

Henri E. Bal: A Comparative Study Of Five Parallel Programming Languages (1991) EurOpen Spring 1991 Conference on Open Distributed Systems, Tromso, pp. 209–228.

Henri E. Bal: Replication Techniques For Speeding Up Parallel Applications On Distributed Systems (Oct. 1989) IR–202, Vrije Universiteit, pp. 1–19.

Tanenbaum, et al.: An Introduction To Amoeba, Vrije Universiteit, pp. 2–7.

S.J. Mullender, et al.: Amoeba —A Distributed Operating System For The 1990's (May 1990) Computer, Published by IEEE Computer Society, pp. 44–53.

F. Douglis, et al.: A Comparison Of Two Distributed Systems: Amoeba And Sprite (Dec. 1991) Computing Systems, vol. 4, No. 3, pp. 353–384.

Henri E. Bal, et al.: Distributed Programming With Shared Data (1988) IEEE Conf. on Computer Languages, IEEE, pp. 82–91.

Henri E. Bal, et al.: ORCA: A Language For Distributed Programming (Dec. 1987) IR–140, Vrije Universiteit, pp. 192–199.

G. van Rossum: AIL —A Class–Oriented RPC Stub Generator For Amoeba (1989) Proc. of the Workshop on Experience with Distr. Systems, Springer Verlag, pp. 82–90.

S.J. Mullender: Distributed Operating Systems: State–Of–The–Art And Future Directions (1988) Proc. of the EUTECO 88 Conf., Vienna, Austria, pp. 53–60.

R. van Renesse, et al.: The Design Of A High–Performance File Server (1989) Proc. Ninth Int'l Conf. on Distr. Comp. Systems, IEEE, pp. 22–27.

E.H. Baalbergen: Design And Implementation Of Parallel Make (Spring 1988) Computing Systems, vol. 1, pp. 135–158.

A.S. Tanenbaum: The Amoeba Distributed Operating System (1993) Vrije Universiteit, 12 pages.

M.F. Kaashoek, et al.: An Efficient Reliable Broadcast Protocol (Oct. 1989) Operating Systems Review, vol. 23, pp. 5–19.

M.F. Kaashoek, et al.: Efficient Reliable Group Communication For Distributed Systems (Jun. 1992) IR–295, Vrije Universiteit, Amsterdam, pp. 1–51.

Overview of Amoeba, pp. 2–13.

C.R. Landau: Security In A Secure Capability–Based System (Oct. 1989) Operating Systems Review, 3 pages.

Sun Microsystems Laboratories, Inc.; SunConnect, Inc., Agorics, Inc.: Real–Time Video Delivery With Market–Based Resource Allocation, pp. 1–25.

Agorics Technical Report ADdoo4.4P: Joule: Distributed Application Foundations (Nov. 1994) pp. 1–93.

Netscape Communications Corporation: SSL v3.0: N Standards Documentation (1995), pp.

B.W. Lampson: A Note On The Confinement Problem (1973) ACM, vol. 16, No. 10, 5 pages.

A.S. Tanenbaum: Distributed Operating Systems (1995) Vrije Universiteit, Amsterdam, The Netherlands, (1995) Prentice Hall.

D. Hellman: Weak Table References, five vague descriptions.

Miller, et al.: Markets And Computation: Agoric Open Systems (1988) The Ecology of Computation, pp. 1–44.

USA–Japan Computer Proceedings: Table Of Contents (Oct. 1978).

Strom, et al.: Optimistic Recovery: An Asynchronous Approach To Fault–Tolerance In Distributed Systems (Proc. FTCS–14, Jun. 1984) IEEE, pp. 374–379.

Kahn, et al.: Money As A Concurrent Logic Program (1988) pp. 1–23.

S.E. Abdullahi, et al.: Collection Schemes For Distributed Garbage, (Sept. 1992) Int'l. Workshop on Memory Management (IWMM) 92, Springer Verlag, pp. 43–81.

P.B. Bishop: Computers With A Large Address Space And Garbage Collection (May 1977) MIT Lab. For Computer Science (LCS) Technical Rpt. 178, MIT, Cambridge, MA.

W.D.Clinger: Foundations Of Actor Semantics (May 1981) MIT, Cambridge, MA.

J.E. Donnelley: Managing Domains In A Network Operating System (1981) Proceedings of the Conference on Local Networks and Distributed Office Systems, Online, pp. 345–361.

C.N.R. Dellar: Removing Backing Store Administration From The Cap Operating System (1980) Operating Systems Review, vol. 14, No. 4, pp. 41–49.

A. Elhabash, et al.: Garbage Collection In An Object Oriented, Distributed, Persistent Environment (1990) ECOOP/OOPSLA '90 Workshop on Garbage Collection.

Hardy U.S. Patent No. 4,584,639 dated April 22, 1986: Computer Security System.

P. Ferreira, et al.: Larchant: Persistence By Reachability In Distributed Shared Memory Through Garbage Collection (May 1996) 16th Intl. Confer. On Distributed Computer Systems (ICDCS) Hong Kong, pp. 1–8.

N. Hardy: KeyKOS Architecture (Sep. 1985) Operating System Review, pp. 1–23.

K. Kahn, et al.: Language Design And Open Systems, The Ecology of Computation (1981), pp. 1–25.

E. Kolodner: Atomic Incremental Garbage Collection And Recovery For Large Stable Heaps Implementing Persistent Object Bases: Principles And Practice, 4th Int. Workshop on Persistent Object Systems, Morgan Kaufman, San Mateo, CA (1991).

H. Levy: Capability–And Object–Based System Concepts, Digital Press (1984) pp. 1–18.

M.S. Miller, et al.: Logical Secrets, Concurrent Prolog: Collected Papers, vol. 2, MIT Press (1987) pp. 140–161.

J.E.B. Moss: Garbage Collecting Persistent Object Stores, ECOOP/OOPSLA '90 Workshop on Garbage Collection (Oct. 1990) pp. 1–5.

S.J. Mullender: Accounting And Resource Control, Distributed Systems, edited by S.J. Mullender, ACM (1989)pp. 133–145.

D. Plainfosse, et al.: A Survey Of Distributed Garbage Collection Techniques, Proceedings of the Intl. Workshop on Memory Management, Kinross, Scotland (Sep. 1995) pp. 211–249.

B. Schneier: Applied Cryptography, Protocols, Algorithms, and Source Code in C.

P.R. Wilson: Uniprocessor Garbage Collection Techniques, Intl. Workshop on Memory Mgmt. (IWMM) 92, Springer Verlag (Sep. 1992) pp. 1–42.

R.P. Draves, et al.: Using Continuations To Implement Thread Management And Communication In Operating Systems, School of Computer Science, Carnegie Mellon University, Pittsburgh, PA, 15 pages.

R.W. Dean: Using Continuations To Build A User-Level Threads Library, School of Computer Science, Carnegie Mellon Universtiy, Pittsburgh, PA, 17 pages.

J.S. Barrera, III: A Fast Mach Network IPC Implementation, School of Computer Science, Carnegie Mellon University, Pittsburgh, PA, 11 pages.

R. Draves: A Revised IPC Interface, (1991) pp. 1–14.

W.S. Frantz, et al.: Object Oriented Transaction Processing In The KeyKOS Microkernel (Sep. 1993) pp. 1–16.

R. Rashid, et al.: Mach: A Foundation For Open Systems, School of Computer Science, Carnegie Mellon University, Pittsburgh, PA, 6 pages.

D.V. Duong: Project Report: Trader Network LRNG 792: Computational Modeling Of Social Learning (1995) pp. 1–6.

J.E.B. Moss, et al.: PMOS: A Complete And Coarse-Grained Incremental Garbage Collector For Persistent Object Stories, ECOOP/OOPSLA '90 Workshop on Garbage Collection (1990) pp. 1–13.

P. Bogle, et al.: Reducing Cross Domain Call Overhead Using Batched Futures, OOPSLA 9th Annual Conference (23–27 Oct. 1994) pp. 341–354.

D. Tribble, et al.: Channels: A Generalization Of Streams, Collected Papers, pp. 447–463.

J.S. Auerbach, et al.: High–Level Language Support For Programming Distributed Systems, 1992 Intl. Conference on Computer Languages (Apr. 20–23, 1992), pp. 320–330.

ParcPlace VisualWorks: Chapter 18: Weak Arrays And Finalization, pp. 311–318.

M. Schelvis: Incremental Distribution Of Timestamp AMP Packets: A New Approach To Distributed Garbage Collection, Object–Oriented Programming: Systems, Languages and Application, OOPSLA Conference Proceedings, vol. 24, No. 10 (Oct. 1–6, 1989) pp. 37–48.

S.E. Abdullahi, et al.: Collection Schemes For Distributed Garbage, Intl. Workshop on Memory Management (IWMMM) 92, Springer Verlag, pp. 43–81 (Sep. 1992).

R.F. Rashid: From Rig To Accent To Match: The Evolution Of A Network Operating system, Studies in Computer Science and Artificial Intelligence (1988) The Ecology of Computation, North Holland, pp. 207–229.

D.F. Ferguson: The Application Of Microeconomics To The Design Of Resource Allocation And Control Algorithms, pp. 1–156.

Object Management Group: The Common Object Request Broker: Architecture And Specification (Jul. 1995) sections 1–21.

William A. Wulf, et al.: HYDRA/C.mmp –An Experimental Computer System (1981) pp. 1–282, McGraw Hill, NY.

1) B.synchronize()
3a) accumulate hasAB(out)
4b) accumulate hashAB(in)
5a) open logs
    5b) logHashAB(out)=
    hashAB(out)
    5c) logHashAB(in)=
    hashAB(in)
6a) B.commit()
    6b) CHashAB(out)=
    hashAB(out)
    6c) close log(out)

9a) CHashAB(in)=
    hashAB(in)
9b) close logAB(in)

2) A.synchonize()
3b) accumulate hashBA(in)
4a) accumulate hashBA(out)

7) CHashBA(in)=
    hashBA(in)

8a) A.commitment()
    8b) CHashBA(out)=
    hashBA(out)
10) A.signatureB(CHashBA(in),
    CHashBA(out))

FIG. 3

11) C. report (logAB,
    logHashAB(out),
    logHashAB(in),
    signatureB(CHashBA(in),
    CHashBA(out))

FIG. 4

LIGHTWEIGHT NON-REPUDIATION SYSTEM AND METHOD

The present invention relates generally to secure communications between computer programs, and, particularly, to security systems that allow a first program to irrefutably prove to a third program the contents of the first program's conversation with a second program.

BACKGROUND OF THE INVENTION

There is a well-recognized need for systems that provide secure, reliable, authenticated communications between networked computer programs. Many prior art systems meet this need by providing encrypted, bi-directional, reliable data streams (EBRDS) between computer programs that are participating in network communications. One such system is the secure socket layer (SSL) protocol of Netscape.

In the Netscape SSL protocol, each communicating program is assigned a key pair consisting of a public cryptographic key and a private cryptographic key. SSL uses the public and private keys for two programs to generate an agreed key that is used to encrypt a conversation between the two programs. This ensures privacy for the conversation and provides assurance to each party that only the other party could generate the other half of the conversation (this property is called two-party authentication).

Reliability in the Netscape SSL protocol is provided by a common hash function that is applied by a sender to the contents of each outgoing packet and by a receiver to the contents of each incoming packet. The sender includes the resulting outgoing hash value in each encrypted message at a designated message position. Upon receiving and decrypting the encrypted message, the receiver computes the incoming hash value for that message and compares the outgoing hash value included in the message with the incoming hash value. If the outgoing and incoming hash value are different, SSL reports an error and terminates the connection. Other prior art systems provide similar reliability checks by applying the well-known parity, checksum and CRC (cyclic redundancy checking) functions to the outgoing and incoming messages. While the Netscape SSL provides secure and reliable network communications, it and many other prior art network security systems do not provide a general property of non-repudiation.

Non-repudiation is a property that enables a first program to authenticate to a third program the contents of part or all of the first program's network conversation with a second program (this property is also called third-party authentication). More generally, third-party authentication means that a first party can prove to a third party that a second party took some action (typically the signing of a document). The name "non-repudiation" is another name for the same property because, in an environment providing third-party authentication, the second party can't convincingly repudiate its action. Some prior art network systems provide a limited type of non-repudiation, but do so only for specific situations and by handling independently each secure transaction for which non-repudiation is required.

In these prior art systems, a program that needs to send securely a non-repudiable piece of information (such as a receipt or a signed check) does so by encrypting that piece of information with its private key, which is equivalent to a digital signature. This technique is called signing. The receiver of the signed message can prove that the encrypted information came from the supposed sender (or anyone who knows the sender's private key) by successfully decrypting the message using the sender's public key. The receiver could also forward the message to a third party, who could similarly verify the sender's identity. Thus, non-repudiation is provided for specific situations.

In many other situations, it would be desirable to provide third-party authentication for entire conversations, which could span thousand or millions of transmissions. Applying the existing non-repudiation approaches to such a lengthy conversation would require each packet in the conversation to be signed and decoded, which would be highly impractical as public key encryption and decryption are computationally expensive. Therefore, there is a need for a system and method that provides non-repudiation in a manner that is computationally lightweight.

SUMMARY OF THE INVENTION

The present invention is a system and method that meets the needs set out above. More particularly, the present invention is a system that provides lightweight non-repudiation for networked computer programs. The system includes a plurality of entities, each with a public and private key and communications channels that provide encrypted, bi-directional data streams between those entities. The bi-directional data streams between first and second entities that are carrying on a conversation include a first data stream carrying messages from the first to the second entity and a second data stream carrying messages from the second entity to the first entity. Each conversation includes a start position in each stream at which the first and second entities synchronize their conversation. Also included in the present invention is a cryptographic hash function that is used by the first and second entities to form hash values representing their conversation.

A cryptographic hash function is one for which it is extremely unlikely that anyone can find two different inputs, such that the hash method would output the same hash value for these different inputs, even when a determined attempt is made to generate such a coincidence.

The hash values computed by the first entity include a first outgoing hash value that represents the accumulated total of the hash function applied to each of the messages in the first stream since the start position and a first incoming hash value that represents the accumulated total of the hash function applied to each of the messages in the second stream received by the first entity since said start position. The hash values computed by the second entity include a second outgoing hash value representing the accumulated total of the hash function applied to each of the messages in the second stream since the start position and a second incoming hash value representing the accumulated total of the hash function applied to each of the messages in the first stream received by the second entity since the start position. Since the hash functions and the contents of the streams are the same, each party's computed incoming hash value will equal the other party's computed outgoing hash value at the same point in the stream Whenever the first entity wants the second entity to commit to part or all of their conversation, the first entity issues a commit message (i.e., a request) to the second entity at a first position in the first stream. A first hash at commit value is stored by the first entity representing the value of the first outgoing hash value at the first position. After receiving the commit message, the second entity stores a second hash at commit value representing the value of the second incoming hash function at the first position. The second entity then issues the first entity a commitment message (i.e., a reply agreeing to the request) at a second position in the second stream that indicates that the second entity wishes to commit to the conversation. The second entity stores a second hash at commitment value that represents the value of the second outgoing hash function at the second position. After receiving the commitment message, the first entity is configured to store a first hash at commitment value representing the value of the first incoming hash function at the second position. The second entity is also configured, after issuing the commitment message, to issue a signed message at a third position in the second stream representing the second hash at commit valueand the second hash at commitment value. The signed message is signed with the private key of the second entity, which proves that it could only have been issued by the second entity or another entity that knows the second entity's private key.

As it accumulates its hashes, the first entity can maintain logs of the first and second streams of the conversation from any position after synchronization to the first position in the first stream and to the second position in the second stream. To memorialize the hashes at the positions corresponding to the beginning of the logs, the first entity stores logged first outgoing and incoming hash values respectively representing values of the first outgoing and incoming hash values recorded by the first entity at those log positions.

The system of the present invention can also include a third entity to which the first entity wishes to prove the contents of its conversation with the second entity. The first entity provides this proof by issuing a report message to the third entity including the signed message, the logged part of the conversation and the logged hash values. Thus, the present invention provides a system and method for lightweight non-repudiation in networked computer systems.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 1A:
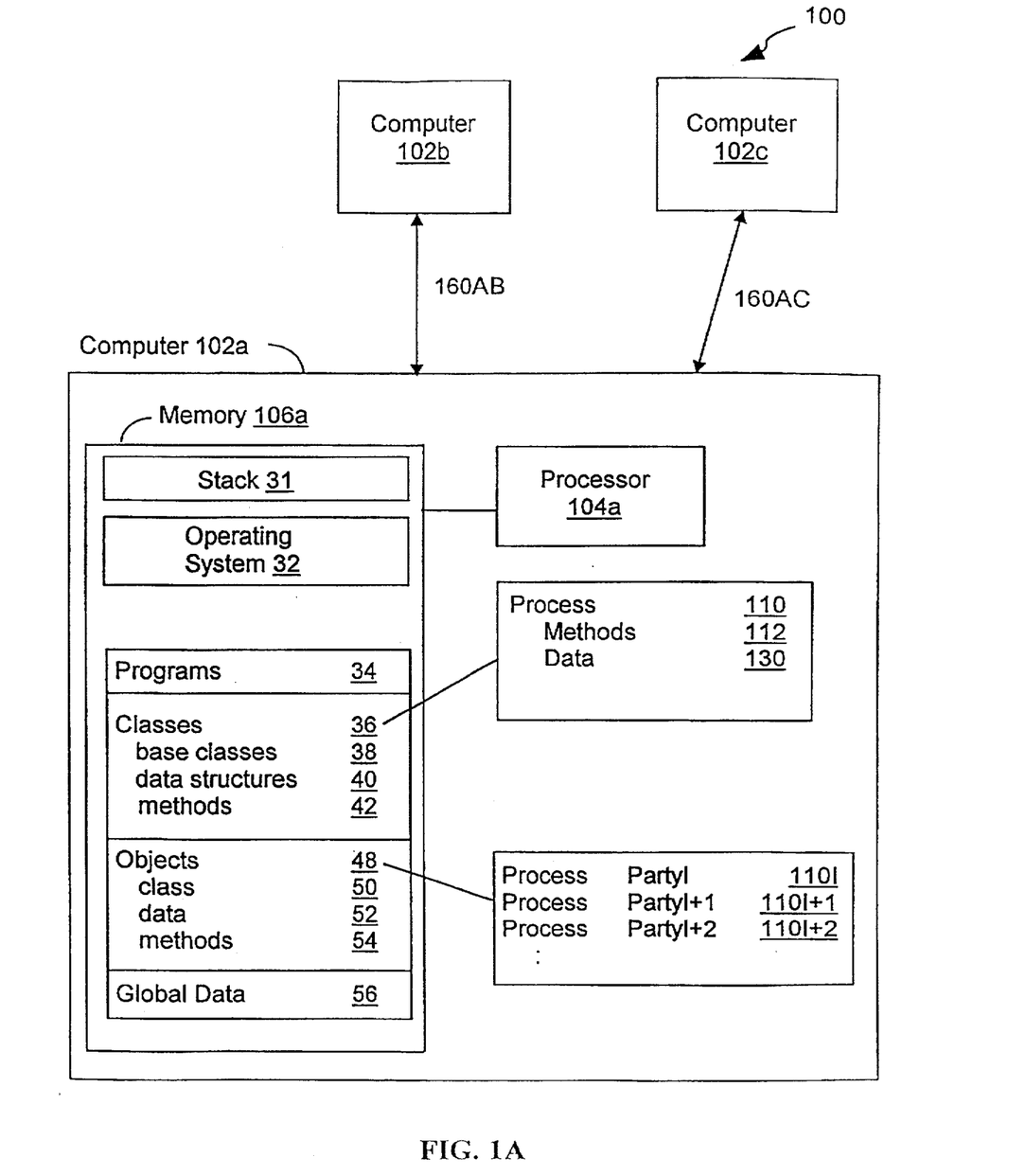
FIG. 1A is a block diagram of the preferred embodiment that illustrates a networked computer system in which the present invention is implemented.

Referring to FIG. 1A, there is shown a block diagram of a networked computer system 100 in which the present invention is implemented. The computer system 100 consists of one or more computers 102 (e.g., the computers 102a, 102b and 102c) which are inter-connected via communications channels 160. At least a subset of the computers 102 have the configuration illustrated for the computer 102a. The computer 102a includes a processor 104a and a memory 106a. The memory 106a could be a fast primary memory, such as a random access memory; a cache memory; a slower secondary memory, such as a hard disk; or any combination of those three types of memory. Details of these software and hardware components are now presented for the representative computer 102a.

The memory 106a of the computer 102a includes stacks 31 used by threads created by the programs 34 and an operating system 32. The memory 106a also includes storage and definitions for building blocks used by the programs 34, including class definitions 36, object instances 48 of the classes 36 and global data 56. The operating system 32 executes in the processor 104 as long as the computer 102 is operational and provides system services for the processor 104 and programs 34 being executed in the processor 104. The programs 34 can be any kind of program, including object-oriented programs.

As is well known, a program 34 written in an object-oriented language, such as C++ or Java, includes class definitions 36 and object declarations 48. Each class definition 36 outlines the data structures 40 and methods 42 associated with that class. A data structure declaration 40 defines the type of the data item (e.g., whether the data item is a structure, an integer, or a user-defined type) and optionally, the accessibility of the data item (i.e., whether the data item is public, meaning accessible to all objects, or private, meaning visible only within object instances of the declared class). A class definition 36 can also optionally identify one or more base classes 38 from which that class inherits methods and data structures.

The objects 48 are instances of one or more classes 36 and incorporate all of the properties (i.e., methods and data structures) of the classes of which they are instances. In contrast to the classes 36, which, in most object-oriented languages, are defined at compile-time, the objects 48 are run-time entities that, in response to messages received from the programs 34 or another object 48, execute their methods and update their own data as a part of program execution. Each object's storage 48 includes a "class" field 50 that indicates the associated classes of which the particular object 48 is an instance and the data 52 derived from those associated classes. The object's methods 54 are not held in the object storage, but in the associated class 36. Referring to FIG. 1A, the class of which a particular object is an instance is represented with a descriptor to the left of the instance identifier. Thus, the preferred embodiment includes a plurality of Party objects 110x (where "x" is a variable, such as I,I+1, etc.), which are instances of a Process class 110. The process class 110 and its object instances 110x are now described in reference to FIG. 1B.

Figure 1B:
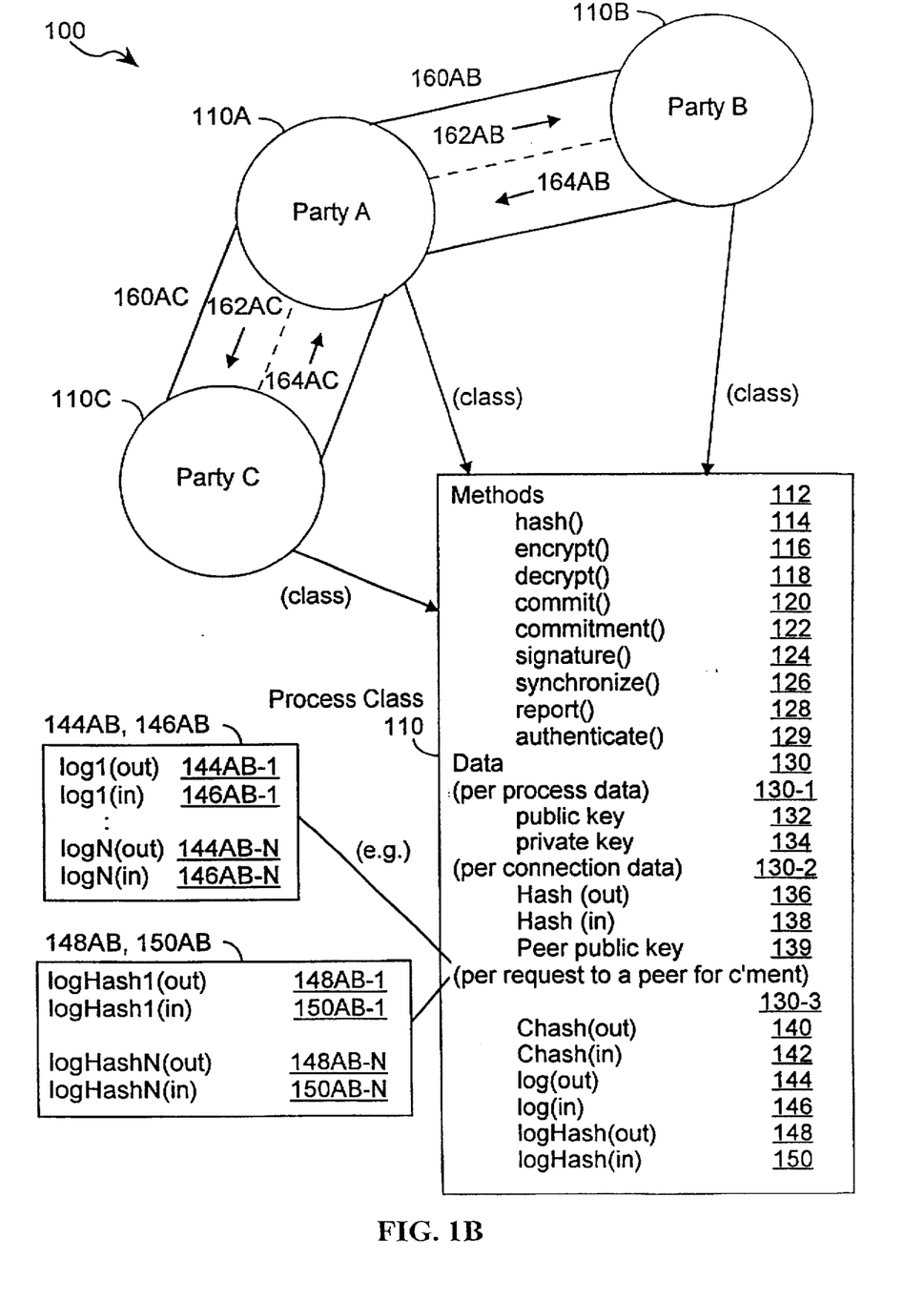
FIG. 1B is a block diagram of the preferred embodiment that illustrates the methods and data structures that permit parties A and B to authenticate their conversation for party C.

Referring to FIG. 1B, there is shown a block diagram of a networked computer system 100 in which the preferred embodiment of the present invention is implemented. The networked system 100 includes three parties A 110A, B 110B and C 110C, each of which is configured to engage in two-way communications with other parties as needed via a channel that provides encrypted, bi-directional, reliable data streams (EBRDS) 160. For example, in FIG. 1B, the parties A 110A and B 110B are communicating via EBRDS 160AB and the parties A 110A and C 110C are communicating via EBRDS 160AC. Each channel/EBRDS 160 consists of two streams 162, 164, one in either direction. Thus, the channel 160AB has streams 162AB (from A to B) and 164AB (from B to A), and the channel 160AC has streams 162AC (from A to C) and 164AC (from C to A). The packets in each stream 162, 164 are seen by the receiver in the same order the packets were sent by the sender. This allows the sender of each stream to mark points/positions in the stream and to know that at those stream positions the receiver will have seen the same packets.

Each of the parties 110A, 110B, 110C is implemented as an instance of a common class 110 that specifies the methods 112 and data structures 130 that allow the parties to provide third-party authentication of their two-party conversations. For example, as is described below, the elements of class 110 permit the party A 110A to document its conversation with the party B 110B in such a manner that party A 110A can later prove to party C 110C the content of all or part of that conversation. Each instance of the class 110 is allocated from the memory of the computer hosting the particular party and executes its methods 112 under the control of the operating system running in the host computer. Referring back to FIG. 1A, each of the parties 100x is executing in a respective computer 102x. I.e., party A 110A, party B 110B and party C 110C are respectively executing in computers 102a, 102b and 102c. However, the parties 110x can be executing in any number of computers as long as they are respectively interconnected via EBRDS channels.

In many situations the party C 110C is merely a judge to whom A wishes to authenticate its conversation with B and has no need to authenticate its own conversations. When this is the case, party C 110C does not need to incorporate all of the methods and data of the class 110. Rather, party C 110C merely has to understand how A and B use the authentication protocols of the present invention so as be able to judge A's evidence purporting to document A's conversation with B.

Brief Descriptions of Methods 112

The methods 112 include hash 114, encrypt 116, decrypt 118, commit 120, commitment 122, signature 124, authenticate 129, synchronize 126 and report 128. The operations of these methods 112 are described in depth in connection with the description of the data structures 130. However, by way of introduction, the methods 112 are now briefly discussed.

The hash method 114 outputs a hash value that is a function of the contents of the hash function's input argument(s). The hash method 112 of the preferred embodiment implements a cryptographic hash function, meaning that it is extremely unlikely that anyone can find two different inputs, such that the hash method 112 would output the same hash value for these two different inputs, even when a determined attempt is made to generate such a coincidence. This is a well-known property of cryptographic hash functions. In the preferred embodiment, each party applies the hash method 114 to the contents of all streams 162, 164 with which it interacts.

The encrypt and decrypt methods 116,118 respectively implement complementary encryption and decryption functions in accordance with the well-known principles of public key cryptography. In the preferred embodiment, the methods 116, 118 respectively make use of the public key 132 and private key 134 associated with each party 110. These methods can also be used to generate the agreed key used by a pair of parties 110 communicating via an EBRDS 160.

The methods commit 120, commitment 122, signature 124, authenticate 129, synchronize 126 and report 128 (and their associated messages, which herein are given the same reference numbers) are used by parties to coordinate, verify, and report their two-party conversations. The present description does not use the terms "commit" and "commitment" in the conventional way. Rather, a commit message 120 is used to request some action of the recipient and a commitment message 122 is the recipient's response indicating agreement to perform the requested action. A second party's (e.g., 110B's) commit method 120 is invoked by a first party (i.e., 110A) via a commit message 120. The commit message 120 includes no arguments but tells the second party, if it is committed to the conversation up to the point associated with the commit message (which could be millions of messages into the conversation), to return a commitment message 122 followed by a signature message 124 setting out a verifiable representation of the second party's version of its conversation with the first party up to that point. After receiving the commitment and signature messages 122, 124, the first party checks its internal version of the conversation for consistency with the second party's signed version. Signed messages are authenticated using the authenticate method 129. For the purposes of this discussion, given that a message x signed by a process A can be represented as y=signature(x, pvtkey.A), if the authenticate method 129, operating on the signature y using A's public key, returns x (i.e., x=authenticate(y, pubkey.A), the initial message could only have been signed with the private key of A.

If the two versions are inconsistent, the first party may abort the conversation or attempt to re-synchronize. The conversation only continues if the hashes remain consistent. In the situations where the parties to a conversation need to resynchronize their conversation, they can exchange synchronization messages 126, which cause the recipient to re-initialize its state. Later, the first party may want to authenticate the conversation with a third party; at that time it would send the saved values. If the first party chooses to present an authenticatable record of the conversation to a third party (e.g., 110C) and if the two versions are consistent, the first party issues a report message 128 to the third party. The contents of the report message 128 allow the third party to verify the conversation as being one in which the second party engaged.

Note that, while the preferred embodiment is implemented using object-oriented techniques, the present invention is also implementable using conventional programming techniques. For example, the commit message 120 could be implemented as a particular byte code in a message stream that invokes a particular subroutine without the involvement of any objects. All such equivalent implementations are intended to be covered by these descriptions and the following claims.

Likewise, while the preferred embodiment makes use of public-key cryptography for signing the non-repudiatable record of the conversation and to generate an agreed key so that the conversation can occur over a secure channel, the present invention only depends on the use of non-repudiatable digital signatures. Were the key-pair system used not capable of providing secrecy, and even were the conversation itself completely in the clear on an open network, and therefore vulnerable to tampering, the effect of such tampering would only be to prevent commitment from occuring, thereby terminating an uncommited conversation. In particular, external tampering cannot result in a commitment to a conversation consisting of anything other than exactly the messages that were sent by each side, in order and with no deletions.

Further description of the methods 112 is provided in connection with the following descriptions of the data structures 130.

Data Structures 130

The data structures 130 can conceptually be broken into three groups:

Group 1: per process data 130-1;

Group 2: per connection data 130-2; and

Group 3: per request to a peer for commitment data 130-3.

1. Group 1 Data 130-1:

Group 1 data 130-1 is data that is common to all of a process's interactions with other processes and includes the public key 132 and the private key 134. As in public key cryptography, a process can distribute its public key 132 but holds secret its private key 134. In the preferred embodiment, the public keys 132 and private keys 134 of two parties communicating via an EBRDS 160 are used to generate an agreed key (not shown) that is used to encrypt and decrypt both sides of the conversation (as in Diffie-Helman cryptography). While each party has only one pair of public and private keys 132, 134, it will have as many agreed keys as it has conversational peers. In some situations, e.g., within a signature message 124, the message contents are encrypted with the sender's private key 134, which enables the receiver or a third party to authenticate the originator of the encrypted contents.

As shown in FIG. 1B, where the party A 110A is communicating with parties B 110B and C 110C, a party can have multiple connections 160 with other parties, each connection 160 being associated with a distinct conversation. For each of these connections, a party has a set of group 2 data 130-2 that characterizes that connection. Thus, the instance 110A, corresponding to party A, would include a set 130AB-2 of group 2 data for A's connection 160AB with party B 110B and a set 130AC-2 of group 2 data representing A's connection 160AC with party C.

2. Group 2 data:

Each set of group 2 data 130-2 stored by a particular party 110 includes outgoing ("hash(out)") and incoming ("hash(in)") values 136, 138 and the public key (or fingerprint) 139 of the peer participating with the particular party over one channel 160. The peer public key 139 is used to negotiate the agreed key for encrypting and decrypting messages sent over the channel 160. The hashes 136, 138 are cumulative totals of the values resulting from the application by the particular party of the hash method 114 to the outgoing (corresponding to hash(out)) and incoming (corresponding to hash(in)) messages sent to and received from its peer over the channel 160. That is, if a party X has sent messages M1, M2 and M3 to its peer Y, the hash(out) 136XY for the party X will equal hash(M1+M2+M3). The hash(out) is updated after each message is sent. I.e., the hash(M1+M2+M3) is actually formed in three steps as follows:

1) hash(M1)=hash(M1);

2) hash(M1+M2)=hash(M1)+hash(M2); and 3) hash(M1+M2+M3)=hash(M1+M2)+hash(M3).

The hash(in) value 138 is similarly aggregated from the party's incoming data stream.

Thus, referring to FIG. 1B, the party A 110A would have the two sets of group 2 data 130AB-2 (for the channel 160AB) and 130AC-2 (for the channel 160AC), as is shown in Table 1.

TABLE 1

| Group 2 data for party 110A | |
|---|---|
| Group 130AB-2 | |
| hashAB(out) | 136AB |
| hashAB(in) | 138AB |
| B's public key | 139B |
| Group 130AC-2 | |
| hashAC(out) | 136AC |
| hashAC(in) | 138AC |
| C's public key | 139C |

In table 1, the hash(out) value 136AB and hash(in) value 138AB respectively represent cumulative hashes on the contents of the data stream 162AB output by party A and on the contents of the data stream 164AB received by party A. The hash values 136AC and 138AC have the same meanings with respect to the data streams 162AC and 164AC. Note that the first group 130AB-2 holds party B's public key 139B and the second group 130AC-2 holds party C's public key 139C.

Each party engaged in a two party conversation maintains outgoing and incoming hashes for the conversation from their own perspective. Thus, the party B 110B has the group 2 data 130BA-2 shown in Table 2, wherein the hashBA(in) value 136BA and the hashBA(out) value 136BA(out) should be uld be the same as party A's values hashAB(out) and hashAB(in) at the same points in their conversation.

TABLE 2

| Group 2 data for party 110B | |
|---|---|
| Group 130BA-2 | |
| hashBA(out) | 136BA |
| hashBA(in) | 138BA |
| A's public key | 139A |

So these values are identical as of the same positions in the streams 162AB, 164B (e.g. A's hashAB(out) value after sending messages M1 and M2 must be the same as B's hashBA(in) value after receiving those messages) the processes set their cumulative hash values 136, 138 to zero (or some agreed value) upon their first connection. Alternatively, if during their conversation two parties fall out of synchronization, the two parties can exchange synchronize messages 126, which cause each party to reset to zero (or some other agreed value) their hashes 136, 138 and begin accumulating the hashes from the same positions in the streams 162 and 164.

3. Group 3 data:

As described above, the preferred embodiment allows a first party to a two-party conversation to maintain hash(out) and hash(in) values 136, 138 reflecting the contents of both data streams 162, 164. By logging the contents of both data streams 162, 164 in an output log 144 and an input log 146, and storing hashes 136, 138 corresponding to known positions in each log, the first party can verify to the third party the first party's version of the two-party conversation. In the preferred embodiment, the stored hashes include logHash (out) 148 and logHash(in) 150, which correspond to the beginning of a logged segment, and CHash(out) 140 and CHash(in) 142, which correspond to the end of a logged segment. These "CHashes" are so designated as they correspond to hash(in) and hash(out) values as of commit and commitment positions in the data streams. To prove to the third party that the second party took part in a logged segment as related by the first party, the first party also needs to obtain the second party's signed CHash(in) and CHash (out) values 142, 140 corresponding to the same positions in the streams 162, 164 as the first party's CHash(out) 140 and CHash(in) 142 values for the given logged segment. The first party obtains this information by issuing a commit message 120 to the second party, which responds by issuing commitment message 122 (if the second party wishes to commit) and a signature message 124, which includes a signed value corresponding to the desired hashes CHash(in) and CHash(out).

In the preferred embodiment, the aforementioned data are stored by a party for each commit message 120 it issues as a set of Group 3 data 130-3. For example, as is shown in FIG. 1B, assuming that party A 110A has issued party B 110B N commit messages 120 and logged N data stream segments, party A would have stored N sets of group 3 data 130AB-3. These N sets would comprise the following:

1. 2N log segments (log1(out) 144AB-1 through logN (out) 144AB-N, and log1 (in)146AB-1 through logN (in)146AB-N);
2. 2N log hash (logHash) values 148AB-I, 150AB-I (I=1 to N) corresponding to the beginning of each of the 2N log segments; and
3. 2N hash at commit (CHash) values 140AB-I, 150AB-I (I=1 to N) corresponding to A's hash values 136, 138 at stream positions following, respectively, each outgoing commit message 120 and each incoming commitment message 122.

Figure 2:
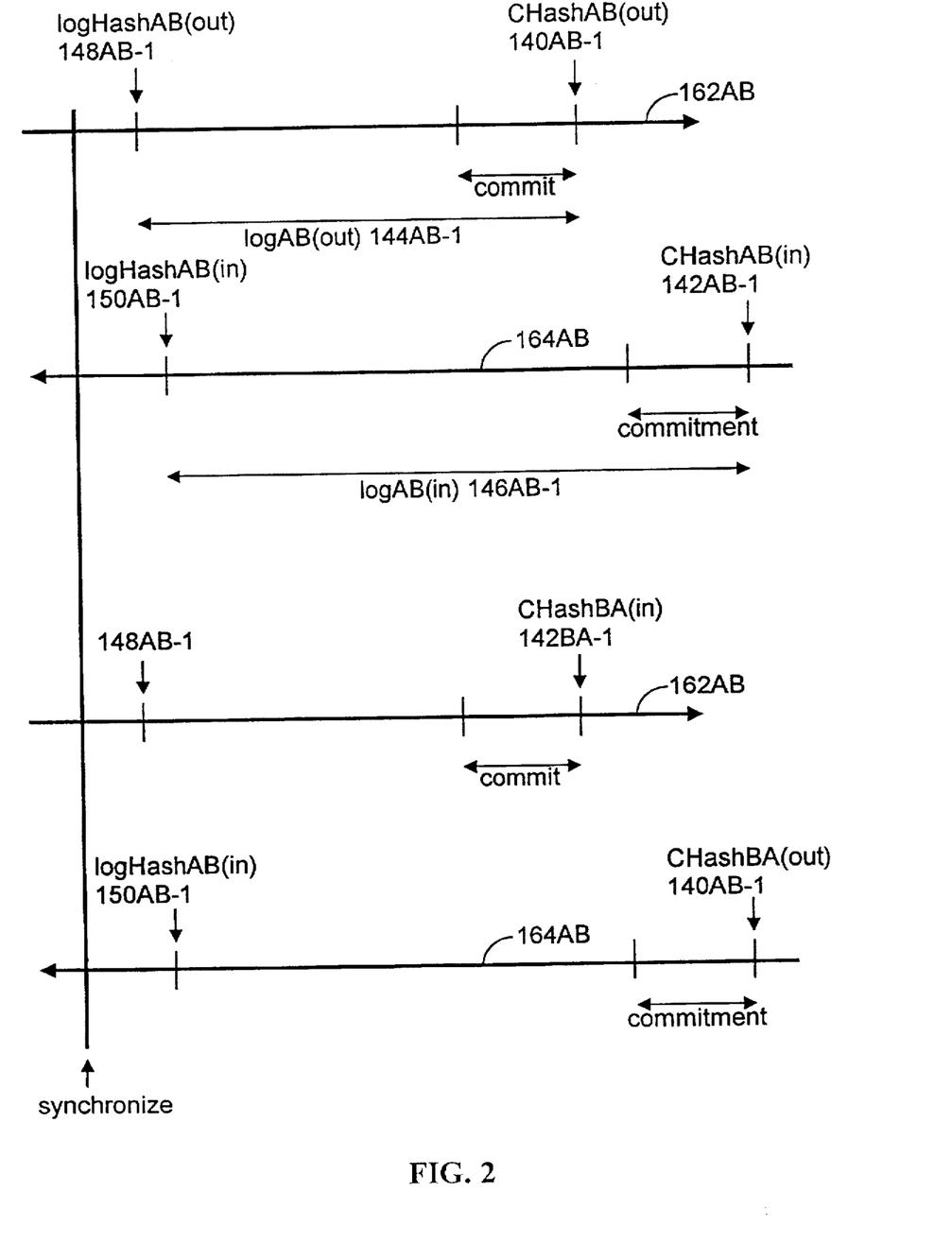
FIG. 2 shows timelines relating the correspondence between various messages exchanged between parties A and B that provide non-repudiability for logged portions of their conversation.

Referring to FIG. 2, there are shown timelines representing hypothetical positions in the data streams 162AB and 164AB relating the logs 144AB-1, 146AB-1; CHashes 140AB-1, 142AB-1; and logHashes 148AB-1, 150AB-1 stored by party A 110A. Below that are two more timelines illustrating the positions at which party B 110B would compute its corresponding CHash 140BA-1 (out) and CHash(in) 142BA-1 values. Note the correspondence between B's CHash(in) and A's CHash(out) values and B's CHash(out) and A's CHash(in) values. Also, as shown in FIG. 2, in the preferred embodiment the CHash(in) and CHash(out) values reflect the commit and commitment messages with which those hash values are associated.

Figure 3:
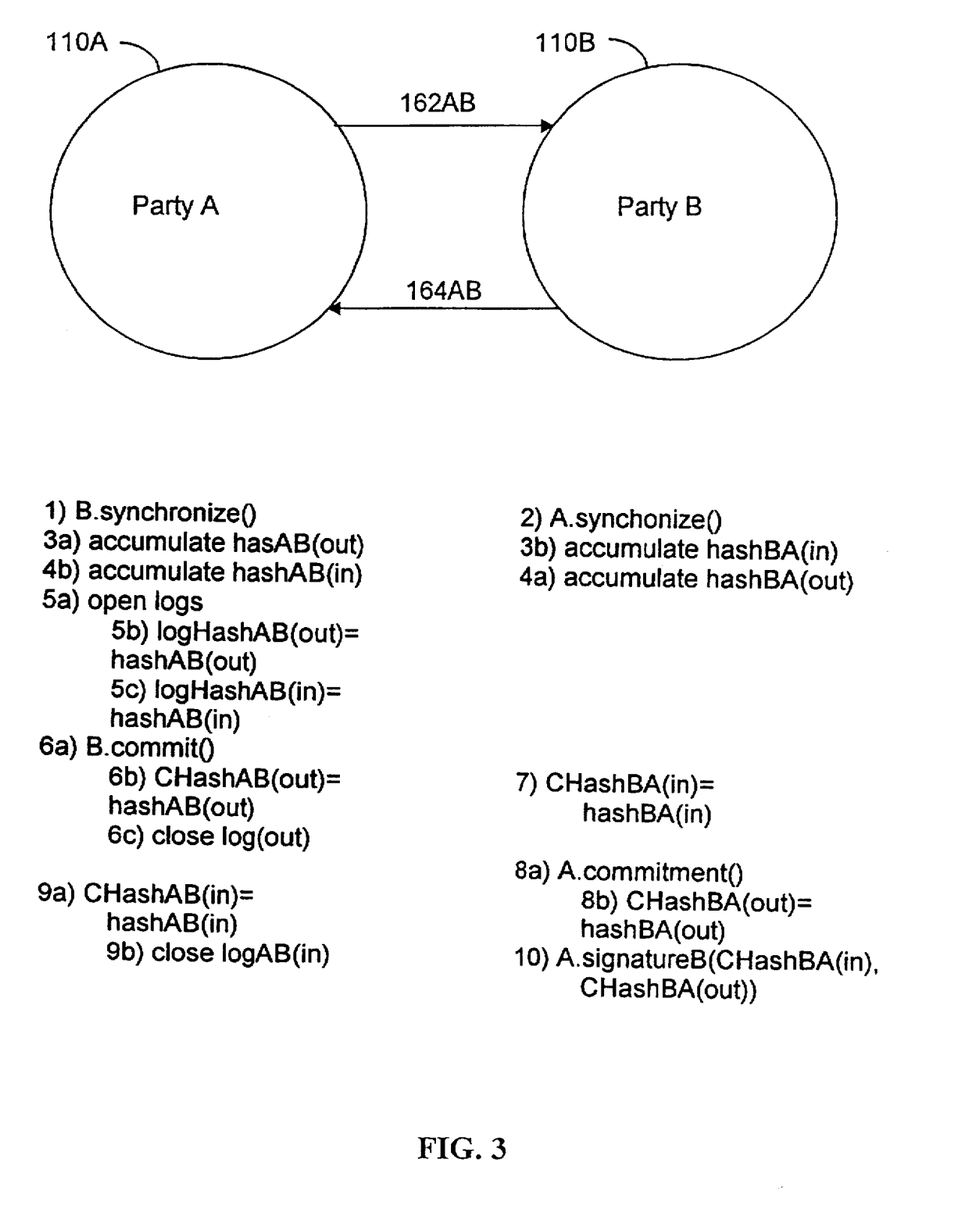
FIG. 3 is a data flow diagram illustrating the messages passed between and the operations performed by parties A and B as they carry on a conversation that can be authenticated to a third party.

Additional information about the typical interaction between two parties A and B whereby the first party (A) gets the second party (B) to commit to their conversation is now provided in reference to FIG. 3, which illustrates the method of the present invention.

Method of the Present Invention

Referring to FIG. 3, there is shown a diagram illustrating the series of messages passing between party A 110A and party B 110B that allow A 110A to generate a third-party authenticatable record of its conversation with party B 110B. In this figure, values are given names that indicate the party to which they belong and their associated connection. For example, A's cumulative hash values 136, 138 on its conversation with B are represented as "hashAB(out) 136AB" and "hashAB(in) 138AB". Similarly, B's hashes are written as "hashBA(out) 136BA" and "hashBA(in) 138BA".

FIG. 3 shows that the first steps (1 and 2) performed by A and B involve synchronizing their conversations so their cumulative hashes 136, 138 are accumulated from the same stream positions. As mentioned above, these steps are not strictly necessary as A and B would have initially set their hashes to zero (or some other agreed value) upon their first connection. In steps 3a and 3b, the parties A and B accumulate their respective hashAB(out) and hashBA(in) values from messages relayed from A to B in the data stream 162AB. Simultaneously, A and B accumulate their respective hashAB(in) and hashBA(out) values from messages relayed from B to A in the data stream 164AB (steps 4a and 4b). At some point (step 5a) in the conversation, A 110A opens respective logs 144AB, 146AB on the data streams 162AB, 164AB. At this point, A writes its running logs hashAB(out) and hashAB(in), respectively, to the variables logHashAB(out) and logHashAB(in) (steps 5b and 5c), which memorializes the starting position of the logs 144AB, 146AB relative to the respective streams. Later (step 6a), party A 110A issues party B 110B a commit message 120 ("B.commit()") and, to document the position in the stream 162AB following the commit message 120, stores its running hashAB(out) 136AB in the hash at commit value CHashAB(out) 140AB and optionally closes logAB(out) 146AB.

Upon receiving the commit message 120, if party B 110B chooses to commit to the conversation thus far, it stores its running hashBA(in) 136BA for the position in the stream 162AB following the commit message 120 in the variable CHashBA(in) (step 7). Then, party B 110B returns a commitment message 122 to party A 110A (step 8a) and writes the hashBA(out) value 136BA corresponding to the position in the data stream 164AB after the commitment message 122 to the hash at commit value CHashBA(out) 140BA (step 8b). Upon receiving the commitment message 122 from party B, party A updates its running hash value hashAB(in) 138 and writes that value to the hash at commit variable CHashAB(in) 142AB (step 9). Finally (step 10), party B 110B issues party A a signature message 124 ("A.signatureB (CHashBA(in), CHashBA(out))") representing B's signature on its hash at commit values CHashBA(out) 140BA and CHashBA(in) 142BA.

Following step 10, A can compare the signed hashes to its own hash at commit values stored at corresponding positions in the data streams 162AB, 164AB and verify whether party B 110B committed to the same conversation.

Figure 4:
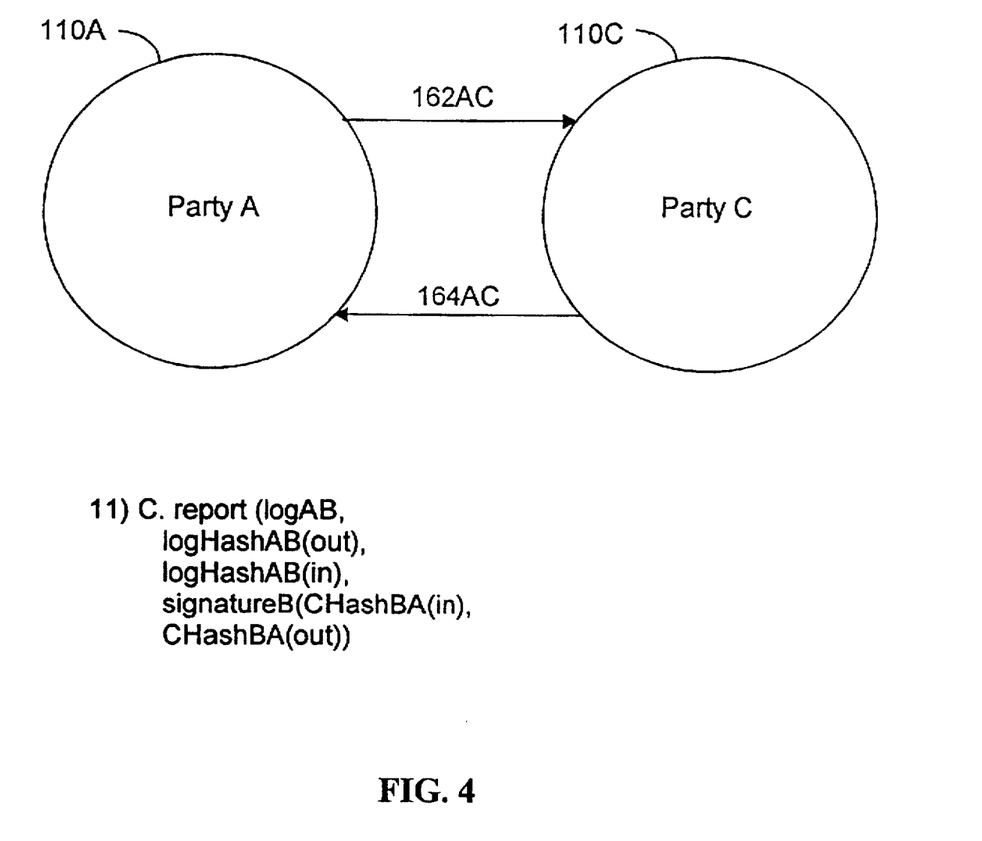
FIG. 4 is a data flow diagram illustrating the messages passed between and the operations performed by parties A and C by which party A authenticates to party C the contents of at least part of A's conversation with B.

Then, as is shown in FIG. 4 (step 11) party A 110A can issue a report 128 to the third party (i.e., party C 110C) including the first party's hashes (logHashes 148, 150 and CHashes 140, 142), any corresponding logs 144, 146 it wishes to prove to party C 110C, and the corresponding signature messages 124 from party B. Note that in FIG. 4, party A 110 is sending data for only a single commit to party C 110C. However, any number of logs and corresponding hashes and signature messages could be relayed to the third party.

Upon receiving the report message 128, party C 110C is able to verify, using A's logs 144AB, 146AB and hashes 140AB, 142AB, 148AB, 150AB, the common hash method 114, that the hashes reported by party A 110A correspond to the reported logs. Then, by successfully authenticating with the authenticate method 129 the signature message from B using B's public key 134B and verifying that the CHash values 142BA(in) and 140BA(out) represented therein are identical to the CHash values 140AB(out) and 142AB(in) reported by A, party C is able to verify that those hash at commit values are from party B 110B and that the conversation committed to by party B 110B must have included the logged portion reported by party A 110A.

The preceding discussion presupposes that party A has logged part or all of its conversation with B so as to be able to provide third-party authenticatability of the logged portions. Detailed tables relating the coordination of the various messages and actions performed by party A 110A and party B 110B for these cases are provided in Appendices A (where the entire conversation is logged by party A 110A) and B (where only portions of the conversation are logged by party A 110A).

Alternatively, even if neither party to a two-party conversation is logging any part of its conversations with a second party, those parties might still have excellent reasons for issuing commit messages. This is because neither party knows what, if any, part of the conversation is being logged by the other party to the conversation. Consequently, due to the possibility of the log existing, upon receiving a commit message, a party that chooses to issue a commitment is compelled to play honestly and report and sign its hashes honestly (otherwise it would be caught by the other side even without a log), and to engage in a pattern of conversation that it would be willing to let third parties know it had engaged-in. For example, making and breaking a promise over such a medium is now more dangerous because of the possible lack of deniability, and so less likely.

Therefore, the system and method of the present invention provide non-repudiability (i.e., third-party authenticatability) in a manner that is computationally lightweight due to the fact that the signed cryptographic exchanges are made only intermittently.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

APPENDIX A

MESSAGES/ACTIONS FOR COMPLETE LOG

| Party A | | | Party B | | |
|---|---|---|---|---|---|
| Out Stream | In Stream | Actions | Actions | Out Stream | In Stream |
| | | synchronize<br>open log(in)<br>open log(out) | synchronize | | |
| msgs(a->b) | | send msgs(a->b) | send msgs(b->a) | msgs(b->a) | |
| | | | rcv msgs(a->b) | | msgs(a->b) |
| commit | msgs(b->a) | rcv msgs(b->a)<br>send commit<br>store CHash (out)<br>store log(out) | | | |
| | | | rcv commit<br>store CHash(in)<br>send commitment<br>store CHash(out) | commitment | commit |
| | commitment | rcv commitment<br>store CHash(in)<br>store log(in) | | | |
| | | | send signB(CHash(in),<br>CHash(out)) | signB(CHash(in),<br>CHash(out)) | |
| | signB(CHash(in),<br>CHash(out)) | rcv signB(CHash(in),<br>Chash(out))<br>decrypt signB(..)<br>compare CHashes<br>save logs and<br>signB(..)<br>as proof of<br>conversation | | | |

APPENDIX B

MESSAGES/ACTIONS FOR PARTIAL LOG

| Party A | | | Party B | | |
|---|---|---|---|---|---|
| Out Stream | In Stream | Actions | Actions | Out Stream | In Stream |
| msgs(a->b) | msgs(b->a) | synchronize<br>rcv msgs(b->a)<br>send msgs(a->b) | synchronize | | |
| | | | rcv msgs(a->b) | | msgs(a->b) |
| | | open log(in)<br>store startHash(in)<br>open log(out)<br>store startHash(out) | | | |
| | | | send msgs(b->a) | msgs(b->a) | |
| msgs(a->b) | msgs(b->a) | rcv msgs(b->a)<br>send msgs(a->b) | | | |
| | | | rcv msgs(a->b) | | msgs(a->b) |

APPENDIX B-continued

MESSAGES/ACTIONS FOR PARTIAL LOG

| Party A | | | Party B | | |
|---|---|---|---|---|---|
| Out Stream | In Stream | Actions | Actions | Out Stream | In Stream |
| commit | | send commit<br>store CHash (out)<br>store log(out) | | | |
| | | | rcv commit<br>store CHash(in)<br>send commitment<br>store CHash(out) | commitment | commit |
| | commitment | rcv commitment<br>store CHash(in)<br>store log(in) | | | |
| | | | send signB(CHash(in),<br>CHash(out)), | signB(CHash(in),<br>CHash(out)) | |
| | signB(CHash(in),<br>CHash(out)) | rcv signB(CHash(in),<br>CHash(out))<br>decrypt signB(..)<br>compare CHashes<br>save startHashes,<br>logs,<br>and signB(..)<br>as proof of<br>conversation | | | |

What is claimed is:

1. A system that provides lightweight, non-repudiation, comprising:

a plurality of entities, each with a public and private key;

communications channels that provide bi-directional data streams between said entities;

first and second entities within said plurality of entities that are carrying on a conversation including at least one message, said bi-directional data streams between said first and second entities including a first data stream carrying messages from said first to said second entity and a second data stream carrying messages from said second entity to said first entity;

a cryptographic hash function;

a start position at which said conversation between said first and second entities is synchronized;

a first outgoing hash value computed by said first entity representing the accumulated total of said hash function applied to each of said messages in said first stream since said start position;

a first incoming hash value computed by said first entity representing the accumulated total of said hash function applied to each of said messages in said second stream received by said first entity since said start position;

a commit message issued by said first entity to said second entity at a first position in said first stream;

a first hash at commit value stored by said first entity representing the value of said first outgoing hash value at said first position;

a commitment message received by said first entity from said second entity at a second position in said second stream when said second entity has commited to said conversation;

a first hash at commitment value stored by said first entity representing the value of said first incoming hash function at said second position, said first entity being configured to compute said first hash at commitment value after receiving said commitment message; and a signed message received by said first entity from said second entity at a third position in said second stream following said commitment message, said signed message representing:

a second hash at commit value representing the accumulated total of said hash function applied to each of said messages in said first stream received by said second entity since said start position up to and including said first position;

a second hash at commitment value representing the accumulated total of said hash function applied to each of said messages in said second stream since said start position up to and including said second position;

said signed message being signed with said private key of said second entity.

2. The system of claim 1, further comprising:

a second outgoing hash value computed by said second entity representing the accumulated total of said hash function applied to each of said messages in said second stream since said start position;

a second incoming hash value computed by said second entity representing the accumulated total of said hash function applied to each of said messages in said first stream received by said second entity since said start position;

said second entity being configured to store said second incoming hash value as said second hash at commit value after receiving said commit message;

said commitment message being issued by said second entity in response to said commit message when said second entity wishes to commit to said conversation;

said second entity being configured to store said second outgoing hash value as said second hash at commitment value after issuing said commitment message;

said second entity being configured to issue to said first entity said signed message at said third position in said second stream following second entity's receipt of said commitment message;

said second entity being configured to sign said signed message with said private key of said second entity.

3. The system of claim 2, further comprising:

a log maintained by said first entity of said first and second streams of said conversation from a log position to said first position in said first stream and said second position in said second stream; and logged first outgoing and incoming hash values respectively representing values of said first outgoing and incoming hash values recorded by said first entity at said log position.

4. The system of claim 3, further comprising:

a third entity; and a report message issued by said first entity to said third entity, said report message including:
said signed message,
logged part of said conversation; and
said logged hash values;

said first entity being able to prove that said second entity took part in at least said logged part of said conversation by issuing said third entity said report message.

5. The system of claim 3, where in, even though said second entity has no intention of keeping a log, said second entity is required to honestly transmit said commitment and signature messages as said commitment and signature messages are verifiable by said first entity regardless of which one of said said second entity and said first entity maintains said log, said second entity is required to engage in an honest pattern of communication that it cannot repudiate and said second entity is unable to determine when said first entity is logging said conversation.

6. The system of claim 2, wherein:

said first hash at commit value represents content of said conversation up to and including said commit message issued by said first entity;

said second hash at commit value represents said content up to including said commit message received from said first entity;

said second hash at commitment value represents said content up to and including said commitment message issued by said second entity; and said first hash at commitment value represents said content up to and including said commitment message received from said second entity.

7. The system of claim 2, wherein said start position represents the point in said conversation at which said first and second entities first connected.

8. The system of claim 2, wherein said start position represents the point in said conversation at which said first and second entities exchanged synchronize messages.

9. A method that provides lightweight, non-repudiation, comprising the steps of:

providing a plurality of entities, each with a public and private key;

providing communications channels that provide bi-directional data streams between said entities;

first and second entities carrying on a conversation by issuing messages over one of said communications channels, said first entity issuing messages to said second entity over a first data stream and said second entity issuing messages to said first entity over a second data stream;

synchronizing at a start position said conversation between said first and second entities;

said first entity computing a first outgoing hash value representing the accumulated total of a cryptographic hash function applied to each of said messages in said first stream since said start position;

said first entity computing a first incoming hash value representing the accumulated total of said hash function applied to each of said messages in said second stream received by said first entity since said start position;

said first entity issuing a commit message to said second entity at a first position in said first stream;

said first entity storing a first hash at commit value representing the value of said first outgoing hash value at said first position;

said first entity receiving a commitment message indicating said second entity has commited to said conversation;

said first entity, upon receiving said commitment message, storing a first hash at commitment value representing the value of said first incoming hash function at said second position; and said first entity receiving at a third position in said second stream coming after said second position a signed message, said signed message representing:
a second hash at commit value representing the accumulated total of said hash function applied to each of said messages in said first stream received by said second entity since said start position up to and including said first position;
a second hash at commitment value representing the accumulated total of said hash function applied to each of said messages in said second stream since said start position up to and including said second position;

said signed message being signed with said private key of said second entity.

10. The method of claim 9, further comprising the steps of:

said second entity computing a second outgoing hash value representing the accumulated total of said hash function applied to each of said messages in said second stream since said start position;

said second entity computing a second incoming hash value computed by said second entity representing the accumulated total of said hash function applied to each of said messages in said first stream received by said second entity since said start position;

said second entity receiving said commit message and storing a second hash at commit value representing the value of said second incoming hash function at said first position;

when said second entity wishes to commit to said conversation, said second entity issuing a commitment message to said first entity;

said second entity storing a second hash at commitment value representing the value of said second outgoing hash function at said second position;

after issuing said commitment message, said second entity issuing said signed message; and said second entity signing said signed message with said private key of said second entity.

11. The method of claim 10, further comprising the steps of:

said first entity maintaining a log of said first and second streams of said conversation from a log position to said first position in said first stream and said second position in said second stream; and said first entity maintaining logged first outgoing and incoming hash values respectively representing values of said first outgoing and incoming hash values recorded by said first entity at said log position.

12. The method of claim 11, further comprising the steps of:

said first entity issuing a report message to a third entity, said report message including:
said signed message,
logged part of said conversation; and
said logged hash values;

said first entity being able to prove that said second entity took part in at least said logged part of said conversation by issuing said third entity said report message.

13. The method of claim 10, wherein:

said first hash at commit value represents content of said conversation up to and including said commit message issued by said first entity;

said second hash at commit value represents said content up to and including said commit message received from said first entity;

said second hash at commitment value represents said content up to and including said commitment message issued by said second entity; and said first hash at commitment value represents said content up to and including said commitment message received from said second entity.

14. The method of claim 10, wherein said start position represents the point in said conversation at which said first and second entities first connected.

15. The method of claim 10, wherein said synchronizing step comprises said first and second entities exchanging synchronize messages at said start time.

16. A system that provides lightweight, non-repudiation, comprising:

a plurality of entities, each with a public and private key;

communications channels that provide bi-directional data streams between said entities;

first and second entities within said plurality of entities that are carrying on a conversation including at least one message, said bi-directional data streams between said first and second entities including a first data stream carrying messages from said first to said second entity and a second data stream carrying messages from said second entity to said first entity;

a cryptographic hash function;

a start position at which said first and second entities synchronize said conversation;

a second outgoing hash value computed by said second entity representing the accumulated total of said hash function applied to each of said messages in said second stream since said start position;

a second incoming hash value computed by said second entity representing the accumulated total of said hash function applied to each of said messages in said first stream received by said second entity since said start position;

a commit message received by said second entity from said first entity at a first position in said first stream;

a second hash at commit value stored by said second entity representing the value of said second incoming hash function at said first position, said second entity being configured to compute said second hash at commit value after receiving said commit message;

a commitment message issued by said second entity in response to said commit message at a second position in said second stream when said second entity wishes to commit to said conversation;

a second hash at commitment value stored by said second entity representing the value of said second outgoing hash function at said second position; and a signed message issued by said second entity at a third position in said second stream following said commitment message, said signed message representing:
said second hash at commit value;
said second hash at commitment value;

said signed message being signed with said private key of said second entity.

17. A method that provides lightweight, non-repudiation, comprising the steps of:

providing a plurality of entities, each with a public and private key;

providing communications channels that provide bi-directional data streams between said entities;

first and second entities carrying on a conversation by issuing messages over one of said communications channels, said first entity issuing messages to said second entity over a first data stream and said second entity issuing messages to said first entity over a second data stream;

synchronizing at a start position said conversation between said first and second entities;

said second entity computing a second outgoing hash value representing the accumulated total of said hash function applied to each of said messages in said second stream since said start position;

said second entity computing a second incoming hash value computed by said second entity representing the accumulated total of said hash function applied to each of said messages in said first stream received by said second entity since said start position;

said second entity receiving a commit message from said first entity at a first position in said first stream;

said second entity receiving said commit message and storing a second hash at commit value representing the value of said second incoming hash function at said first position;

when said second entity wishes to commit to said conversation, said second entity issuing a commitment message to said first entity;

said second entity storing a second hash at commitment value representing the value of said second outgoing hash function at said second position; and after issuing said commitment message, said second entity issuing a signed message at a third position in said second stream, said signed message representing:
said second hash at commit value; and
said second hash at commitment value;

said second entity signing said signed message with said private key of said second entity.

18. The system of claim 1, wherein said conversation is encrypted in order to provide secrecy from eavesdroppers.

19. The method of claim 9, wherein said conversation is encrypted in order to provide secrecy from eavesdroppers.

* * * * *

UNITED STATES PATENT AND TRADEMARK OFFICE
CERTIFICATE OF CORRECTION

PATENT NO. : 5,790,669
DATED : August 4, 1998
INVENTOR(S) : Miller

It is certified that error appears in the above-identified patent and that said Letters Patent is hereby corrected as shown below:

In Column 15, line 25: In Claim 5, please replace "said said second entity" with --said second entity--.

In Column 13, line 59: In Claim 1, please replace "commited" with --committed--.

Signed and Sealed this

Seventeenth Day of November, 1998

Attest:

BRUCE LEHMAN

Attesting Officer    Commissioner of Patents and Trademarks